United States Patent
Dailey et al.

(10) Patent No.: US 12,179,166 B2
(45) Date of Patent: Dec. 31, 2024

(54) MEDIA TANK

(71) Applicant: A. O. SMITH CORPORATION, Milwaukee, WI (US)

(72) Inventors: Philip David Dailey, Columbus, OH (US); Christopher Thomas Hughes, Columbus, OH (US)

(73) Assignee: A. O. SMITH CORPORATION, Milwaukee, WI (US)

( * ) Notice: Subject to any disclaimer, the term of this patent is extended or adjusted under 35 U.S.C. 154(b) by 408 days.

(21) Appl. No.: 17/574,241

(22) Filed: Jan. 12, 2022

(65) Prior Publication Data

US 2023/0127000 A1 Apr. 27, 2023

Related U.S. Application Data

(60) Provisional application No. 63/272,008, filed on Oct. 26, 2021.

(51) Int. Cl.
*B01J 19/24* (2006.01)
*B01D 24/14* (2006.01)
(Continued)

(52) U.S. Cl.
CPC ............ *B01J 19/245* (2013.01); *B01J 20/20* (2013.01); *B01J 20/28052* (2013.01);
(Continued)

(58) Field of Classification Search
CPC .... B01J 19/245; B01J 20/20; B01J 20/28052; B01J 47/022; C02F 1/283; C02F 1/42;
(Continued)

(56) References Cited

U.S. PATENT DOCUMENTS

| 8,110,103 B2 | 2/2012 | Mormino et al. |
| 8,377,298 B2 | 2/2013 | Stolarik et al. |

(Continued)

FOREIGN PATENT DOCUMENTS

| CA | 3080575 A1 | 8/2016 | |
| CN | 107902738 A * | 4/2018 | ............ C02F 1/5281 |

(Continued)

OTHER PUBLICATIONS

Machine-generated English translation of CN 107902738, generated on Apr. 17, 2024.*

(Continued)

*Primary Examiner* — Fred Prince
(74) *Attorney, Agent, or Firm* — Michael Best & Friedrich LLP

(57) ABSTRACT

A media tank includes a housing having a first housing portion coupled to a second housing portion at an interface between the first and second housing portions, the first and second housing portions collectively defining an interior volume of the housing, and a divider positioned within the interior volume of the housing at the interface between the first and second housing portions to separate the interior volume into a first chamber at least partially defined by the first housing portion and the divider and a second chamber at least partially defined by the second housing portion and the divider. The first housing portion is coupled to the second housing portion via a friction weld at the interface. An annular gap is provided between the divider and the first housing portion. Flash from the friction weld is received within the annular gap.

18 Claims, 4 Drawing Sheets

(51) Int. Cl.
*B01J 20/20* (2006.01)
*B01J 20/28* (2006.01)
*B01J 47/02* (2017.01)
*B01J 47/022* (2017.01)
*C02F 1/28* (2023.01)
*C02F 1/42* (2023.01)
*C02F 101/10* (2006.01)

(52) U.S. Cl.
CPC ............. *B01J 47/022* (2013.01); *C02F 1/283* (2013.01); *C02F 1/42* (2013.01); *B01D 24/14* (2013.01); *C02F 2101/10* (2013.01); *C02F 2201/002* (2013.01); *C02F 2201/004* (2013.01)

(58) Field of Classification Search
CPC ............ C02F 2101/10; C02F 2201/002; C02F 2201/004; B01D 24/14
USPC .............................. 210/172.1, 263, 283, 285
See application file for complete search history.

(56) References Cited

U.S. PATENT DOCUMENTS

| | | |
|---|---|---|
| 8,490,855 B2 | 7/2013 | Kingston et al. |
| 10,106,434 B2 | 10/2018 | Vaughan |
| 2009/0039009 A1 | 2/2009 | Stolarik et al. |
| 2010/0263746 A1 | 10/2010 | Stolarik et al. |
| 2016/0243469 A1 | 8/2016 | Shmidt et al. |
| 2016/0311694 A1 | 10/2016 | Vaughan |
| 2020/0338471 A1 | 10/2020 | Dimotsis et al. |
| 2020/0353564 A1 | 11/2020 | Vaughan et al. |

FOREIGN PATENT DOCUMENTS

| | | | |
|---|---|---|---|
| EP | 2106728 A1 | 10/2009 | |
| JP | 2007113569 A | * 5/2007 | ......... B01D 46/0005 |
| WO | 2005123602 A1 | 12/2005 | |

OTHER PUBLICATIONS

Machine-generated English translation of JP 2007113569, generated on Apr. 17, 2024.*
European Patent Office. Extended European Search Report for application 22199904.8, dated Mar. 16, 2023 (7 pages).
European Patent Office Action for Application No. 22199904.8 dated Nov. 29, 2023 (6 pages).

* cited by examiner

MEDIA TANK

CROSS-REFERENCE TO RELATED APPLICATIONS

This application claims priority to U.S. Provisional Application No. 63/272,008 filed Oct. 26, 2021, the entire contents of which are incorporated by reference herein.

BACKGROUND

The present disclosure relates to a media tank such as an injection molded media tank having multiple components welded together to form a vessel.

Media tanks are typically used in water treatment systems, for example, point-of-entry ion exchange water softening systems. Such media tanks are used to house one or more beds of media (for example, an ion-exchange resin or granular activated carbon media) through which water containing impurities (for example, water having an undesirably high dissolved mineral content, referred to as "hard" water) is circulated. As the water passes through the media bed or beds, the undesirable impurities (e.g. calcium and magnesium) are removed from the water, resulting in softened and/or filtered water.

SUMMARY

A media tank includes a housing having a first housing portion coupled to a second housing portion at an interface between the first and second housing portions, the first and second housing portions collectively defining an interior volume of the housing, and a divider positioned within the interior volume of the housing at the interface between the first and second housing portions to separate the interior volume into a first chamber at least partially defined by the first housing portion and the divider and a second chamber at least partially defined by the second housing portion and the divider. The first housing portion is coupled to the second housing portion via a friction weld at the interface. An annular gap is provided between the divider and the first housing portion. Flash from the friction weld is received within the annular gap.

A method of assembling a media tank includes providing a divider at an interface between a first housing portion and a second housing portion, the divider separating an interior volume defined by the first and second housing portions into a first chamber and a second chamber. At least one of the first and second housing portions is free to translate with respect to the divider. The method further includes friction welding the first housing portion to the second housing portion, thereby generating flash at the interface, and preventing translation between said at least one of the first and second housing portions and the divider with the flash generated at the interface.

A media tank includes a housing having a first housing portion coupled to a second housing portion at an interface between the first and second housing portions, the housing having a radial recess formed at or adjacent to the interface, the first and second housing portions collectively defining an interior volume of the housing. The media tank also includes a divider positioned within the interior volume of the housing at the interface between the first and second housing portions, the divider having a radial protrusion that extends into the radial recess of the housing to maintain the axial position of the divider at the interface. The first housing portion is coupled to the second housing portion via a friction welding process that generates flash at the interface. The flash forms at least a partial radial seal between the divider and the housing.

Other features and aspects of the disclosure will become apparent by consideration of the following detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways. Also, it is to be understood that the phraseology and terminology used herein is for the purpose of description and should not be regarded as limiting.

Figure 2:
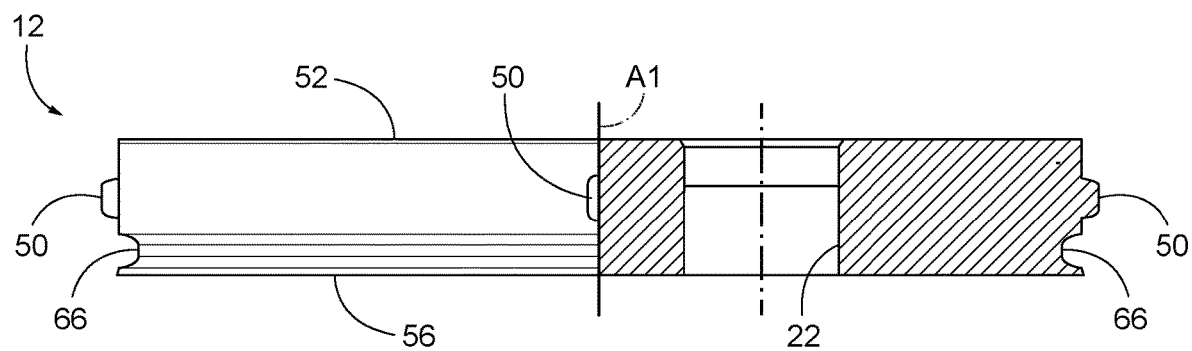
FIG. 2 a cross-sectional side view of the divider of FIG. 1.
Figure 1:
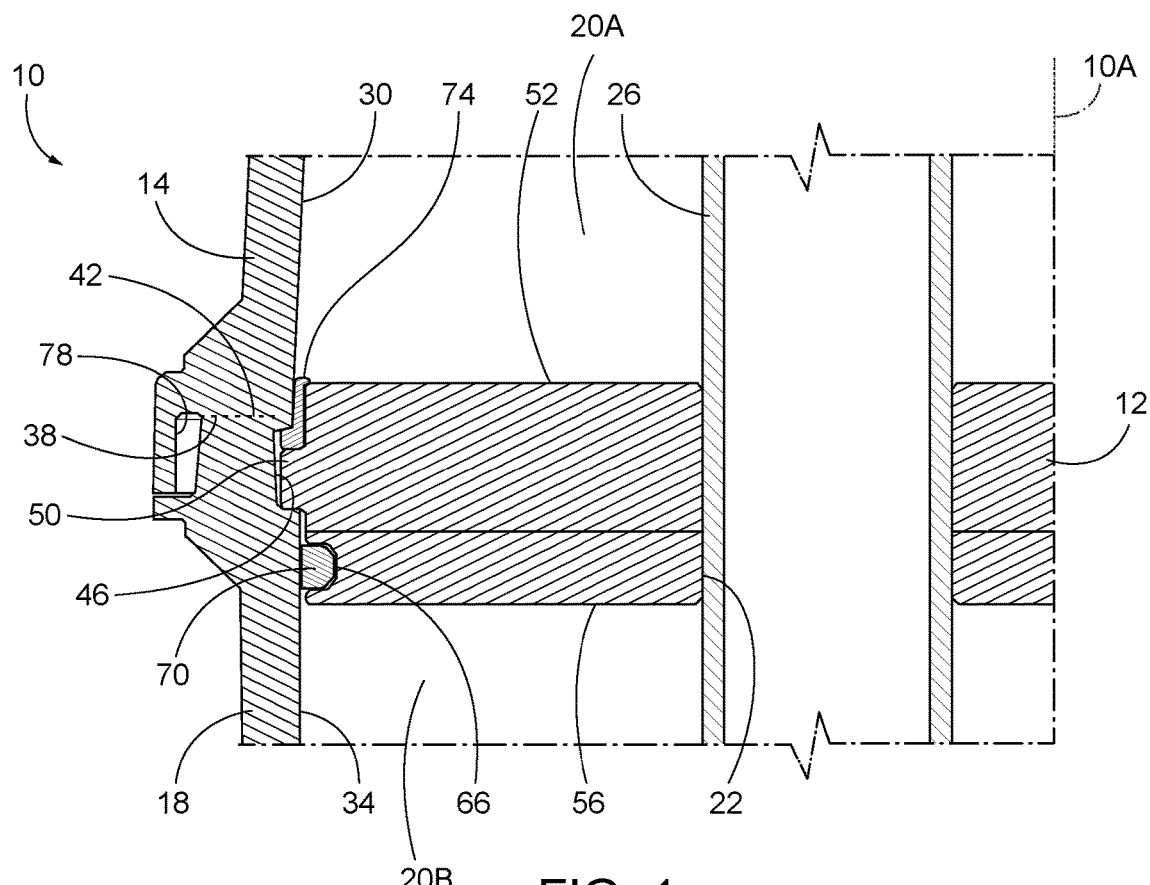
FIG. 1 is a partial cross-sectional side view of a media tank having a divider and a housing.
Figure 5:
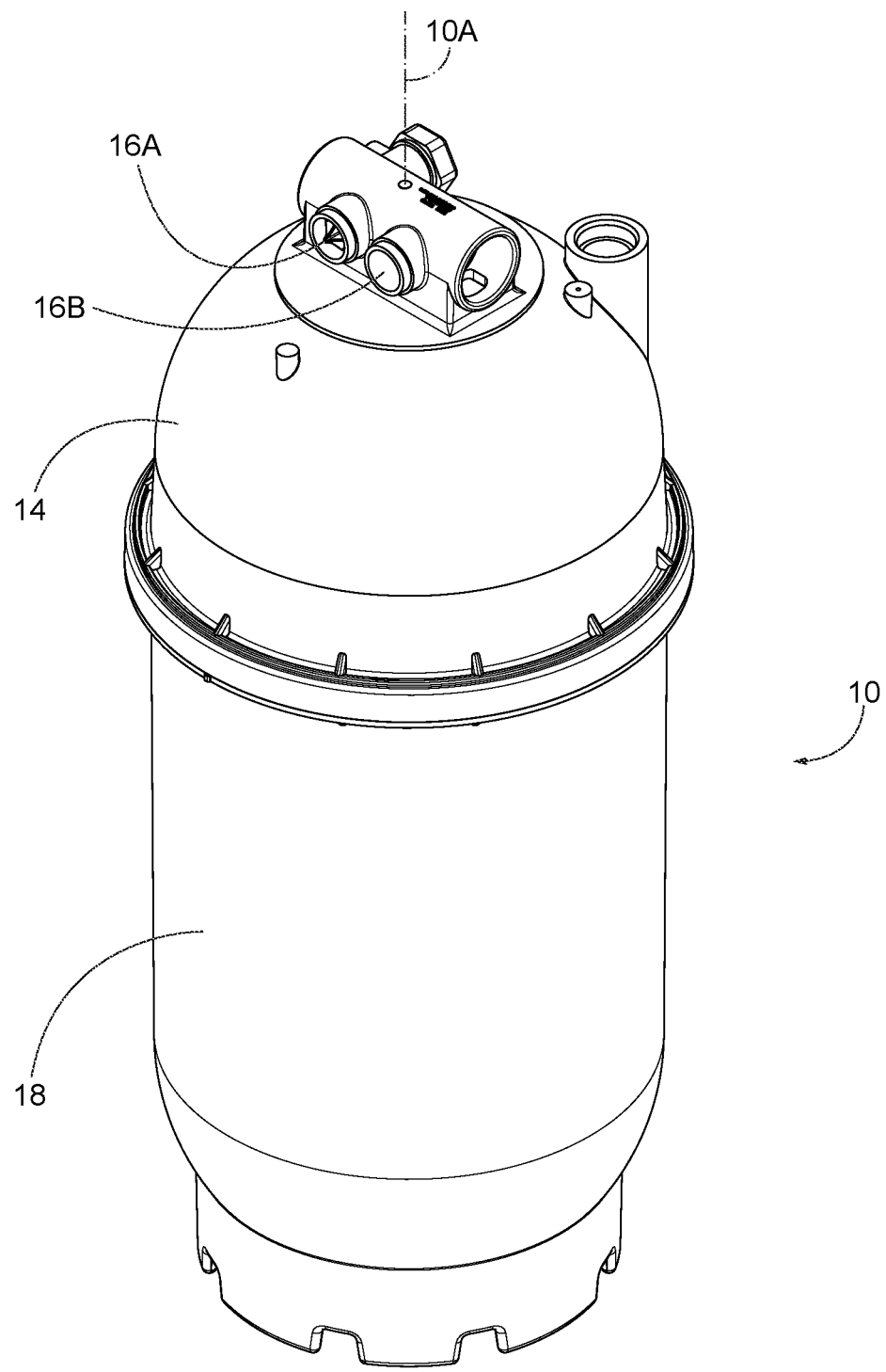
FIG. 5 is a perspective view of a media tank according to an embodiment of the invention.

FIGS. 1 and 5 illustrate a media tank 10 that is elongated along a longitudinal axis 10A. The media tank 10 includes a divider 12 and a housing defined by a first housing portion 14 and a second housing portion 18. Although the housing can be oriented with the longitudinal axis 10A vertically, horizontally, or any angle in between depending on the installation, it is illustrated in FIG. 1 vertically and the first housing portion 14 is above the second housing portion 18. The media tank 10 is a vessel such as a water treatment vessel defining an interior volume. The divider 12 and first and second housing portions 14, 18 may be made of a plastic material and, in some embodiments, may be separately produced via injection molding processes. Only a portion of the first and second housing portions 14, 18 is shown in FIG. 1.

The overall length of the media tank 10 (i.e., the major dimension along the longitudinal axis 10a) is chosen based on the application and use case. The divider 12 separates an interior volume of the media tank 10 into a first chamber 20A on one side of the divider 12 (above the divider 12 in FIG. 1) and a second chamber 20B on the other side of the divider 12 (below the divider 12 in FIG. 1). A first media (not shown) for treating water is arranged within the first chamber 20A, and a second media (not shown) for treating water is arranged within the second chamber 20B. By way of example, the first media can be an ion-exchange resin to remove hard minerals such as calcium and magnesium from the water, and the second media can be granular activated carbon to remove other contaminants from the water.

The media tank 10 includes an inlet 16A (illustrated in FIG. 5) in communication with the first chamber 20A and an outlet 16B (also illustrated in FIG. 5) in communication with the second chamber 20B. The locations of the inlet and outlet 16A, 16B may alternatively be within the sidewalls of the respective first and second housing portions 14, 18.

Water or other liquids (for example, water having dissolved solids therein) enters the media tank 10 via the inlet 16A into the first chamber 20A.

The divider 12 includes a water permeable surface that allows water to pass therethrough. As such, the water moves from the first chamber 20A, through the divider 12, and to the second chamber 20B while the divider 12 prevents any media from passing therethrough. The dissolved solids in the water adhere to the media in the first chamber 20A such that the water flowing into the second chamber 20B is filtered water having a reduced content of dissolved solids. The water is further filtered by the media in the second chamber 20B and exits the second chamber 20B via the outlet 16B.

In at least some cases, the flow of water through the housing 10 may be reversed. For example, during a regeneration of the ion-exchange media, a flow of brine water can be directed into the housing through the outlet 16B into the second chamber 20B. The flow of brine water moves from the second chamber 20B, through the divider 12, and to the first chamber 20A while the divider 12 prevents any media from passing therethrough. Salt within the brine water displaces the adhered solids from the media in the first chamber 20A, thereby regenerating the media for further use. The displaced solids are carried away by the brine water, which exits the housing 10 through the inlet 16A.

Figure 4:
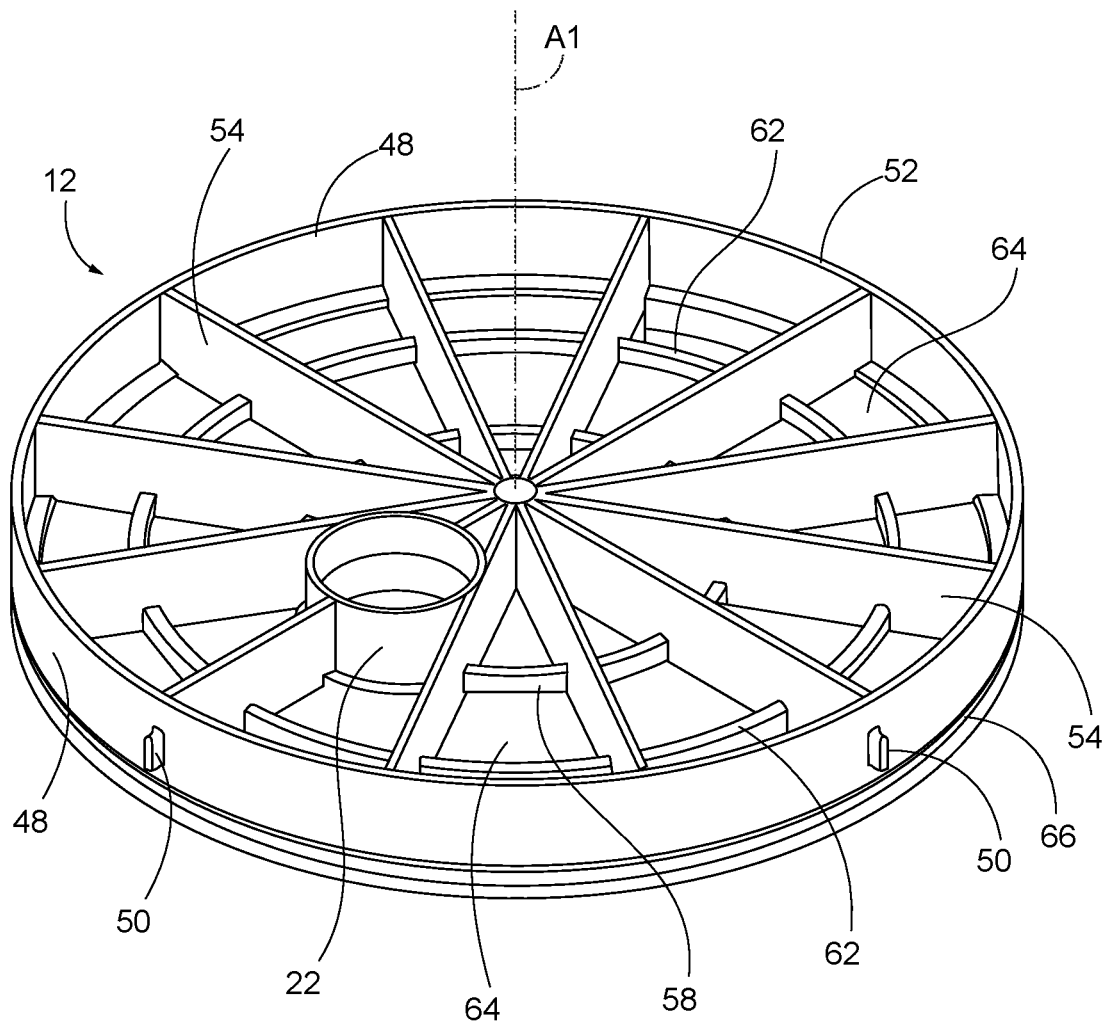
FIG. 4 is a perspective view of a divider of FIG. 1.

The divider 12 is shown in greater detail in FIG. 4. As shown, the divider 12 has a substantially circular cross-section centered on a central axis A1 that is coaxial with the longitudinal axis 10A of the media tank 10. A plurality of radial supports 54 extend outward from the central axis A1 to an outer ring support 48 that at least partially defines an outer radial profile of the divider 12. As shown, the divider 12 includes twelve equally spaced radial supports 54, though more or fewer may be used to modify the stiffness of the divider 12. First and second inner ring supports 58, 62 interconnect the radial supports 54 at different radial distances between the central axis A1 and the outer ring support 48. Collectively, the outer ring support 48, the first and second inner ring supports 58, 62, and the radial supports 54 form a circular web or dart board arrangement of support panels.

A screen or cloth insert 64 is water permeable and extends across the circular cross-section of the divider 12, filling the gaps defined between the outer ring support 48, the first and second inner ring supports 58, 62, and the radial supports 54. The insert 64 has a porosity or mesh sufficiently tight to prevent the filter media from moving from the first chamber 20A to the second chamber 20B across the filter 12. In some embodiments, the screen 64 is a polyethylene fabric. In some embodiments, the screen 64 is insert-molded within the divider 12. In other embodiments, the screen 64 is integrally formed from the same material as the rest of the divider 12.

With continued reference to FIG. 4, the divider 12 includes a cylindrical passage 22 extending axially (i.e., parallel to the central axis A1) therethrough. As shown, the cylindrical passage 22 is offset radially from the central axis A1 but still within the outer ring support 48. In other embodiments, the cylindrical passage 22 may be centered on the central axis A1. The cylindrical passage 22 is not covered by the screen 64 and therefore provides a bypass passageway through the divider 12 and bypassing the screen 64. As shown in FIG. 1, a conduit or riser tube 26 may be positioned within the passageway 22 to further define the bypass passage. The riser tube 26 can be used to provide a fluid pathway between the second chamber 20B and the outlet 16B.

Figure 3:
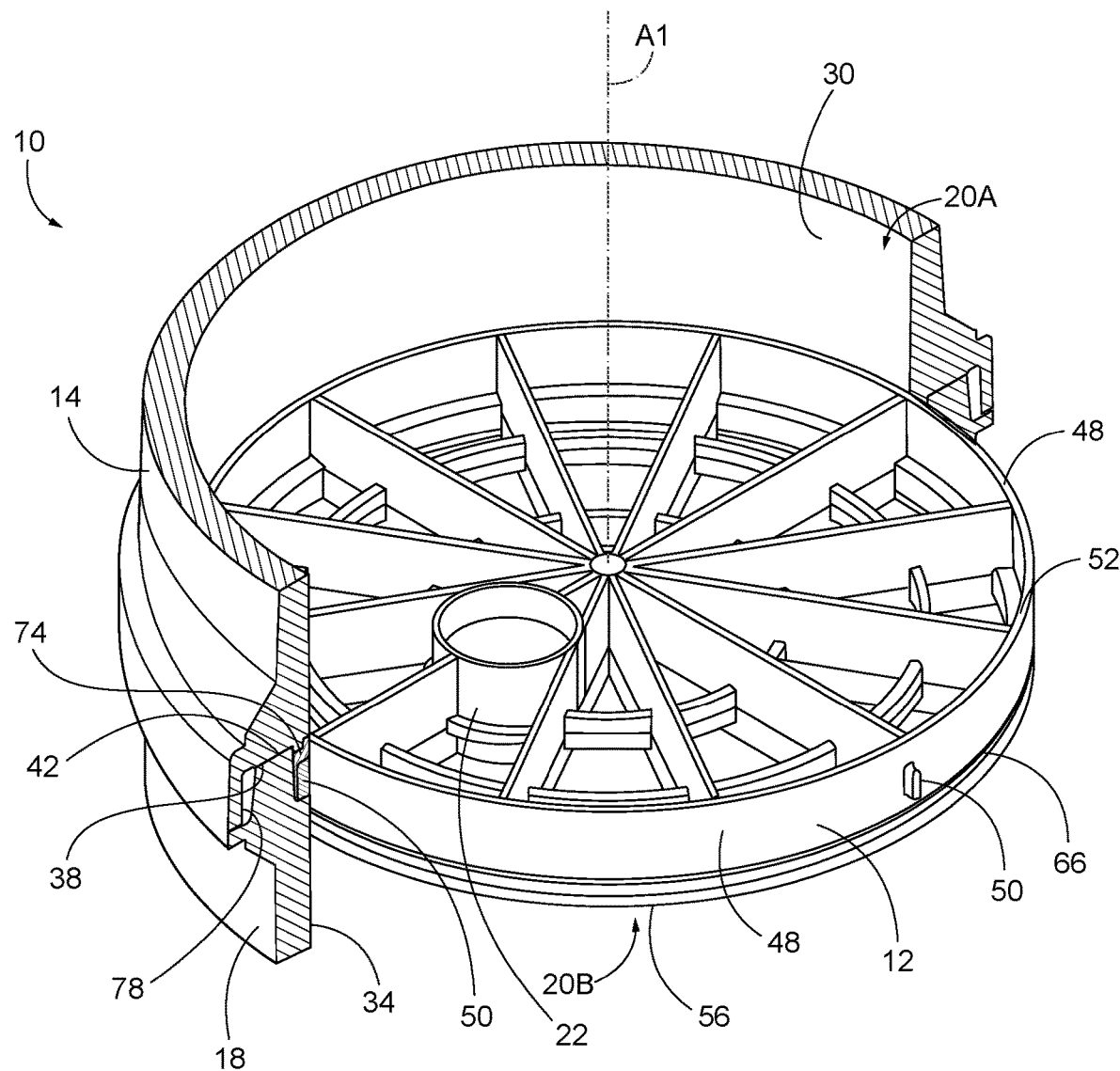
FIG. 3 is a partial cross-sectional perspective view of the media tank shown in FIG. 1.

Referring now to FIGS. 1-4, the outer surface of the outer ring support 48 is cylindrical and includes a first end 52 (which is an upper end in FIGS. 1, 3, and 4) and a second end 56 (which is a lower end in FIGS. 1, 3, and 4). A plurality of distinct, individual, and evenly-spaced radial protrusions 50 extend radially outward from the cylindrical outer surface of the outer ring support 48. The radial protrusions 50 form a support structure for at least partially maintaining the location of the divider 12 relative to the housing portions 14, 18. In alternative embodiments, the distinct, radial protrusions 50 are replaced by a single protrusion extending outward along most or all of the circumference of the outer ring support 48.

Also as seen in FIGS. 1-4, a circumferential channel 66 extends around the outer circumference of the outer ring support 48 near the second end 56. The circumferential channel 66 is axially offset from the radial protrusions 50. As seen in FIG. 1, the circumferential channel 66 defines a seat for a radial seal 70, such as an O-ring, which assists in sealing the radial interface between the divider 12 and the first and second housing portions 14, 18. The radial seal 70 prevents the undesirable migration of media from the first chamber 20A to the second chamber 20B. However, as will be described in further detail below, in some embodiments the radial seal 70 is not necessary and can be optional.

As shown in FIGS. 1 and 3, the first housing portion 14 and the second housing portion 18 are formed initially as separate, distinct components. By way of example, the housing portions 14 and 18 can both be injection molded plastic components. The first housing portion 14 has an axial extent or interfacing end 38. The second housing portion 18 likewise includes an axial extent or interfacing end 42 that is configured to be positioned against the interfacing end 38 of the first housing portion 14. The first and second housing portions 14, 18 abut against one another at the interfacing ends 38, 42 to define an interface between the two housing portions 14, 18. The two interfacing ends 38, 42 are planar, annular surfaces that mate flush against one another, ready for a friction welding operation (e.g., friction stir welding) to couple the two housing portions 14, 18 together.

With the interfacing ends 38, 42, positioned against one another, the inner cylindrical walls 30, 34 of the first and second housing portions define the interior volume of the housing 14, 18. One or both of the inner walls 30, 34 includes a radial recess 46 where the generally cylindrical wall(s) 30, 34 is radially offset to define a channel. As shown, the radial recess 46 is axially aligned with the interface 38, 42 between the two housing portions 14, 18. As shown in FIG. 1, the radial protrusions 50 are positioned within the radial recess 46, thereby supporting the divider 12 between the two housing portions 14, 18. More specifically, the divider 12 is supported at the interface 38, 42 between the two housing portions 14, 18. The divider 12 is held in an axial position that is aligned with the interface 38, 42 such that the interface 38, 42 is located at an axial position that is between the location of the ends 52 and 56 of the divider plate 12.

With a media tank 10 formed of two housing halves 14, 18, such as a tank 10 formed via an injection molding process, the two housing portions 14, 18 are made separately, then welded together to form the vessel. In a vibration welding process, the oscillation amplitude of the housing portions 14, 18 is great enough to sheer off the divider 12 if the divider is rigidly located within the weld. Additionally, too much motion of the divider in the friction welding process may result in damage to the screen 64. The protrusions 50 are located within that portion of the radial recess 46 that is defined by the housing portion 18, with minimal radial clearance between the outward facing edges of the protrusions 50 and the cylindrical wall of the housing portion 18. Accordingly, movement of the divider 12 relative to the housing portion 18 is fairly restricted. Particularly in the case where the radial seal 70 is present, the allowable movement of the divider 12 relative to the housing portion can be minimal. In contrast, the inner cylindrical wall 30 of the housing portion 14 is located entirely above the protrusions 50, such that the annular gap between the wall 30 and the outwardly facing cylindrical wall of the outer ring support 48 of the divider 12 leaves the divider 12 free to translate, with respect to the housing portion 14, in a plane that is perpendicular to the axis A1. In other words, the divider 12 is able to float relative to the housing portion 14. The use of the term "float" identifies that the divider 12 is not rigidly tied down to the housing portion 14. In some embodiments, the divider 12 may be capable of minor axial movement and may be rotatable when positioned between the two housing portions 14, 18 (when the two housing portions 14, 18 are not yet fastened together).

To prepare the assembly for friction welding, the housing portion 18 is rigidly secured, with the divider 12 inserted into the recess. In the friction welding process, heat generated by rotating/oscillating the housing portion 14 relative to the other housing portion 18 generates flash. The flash is the excess material that melts and is extruded away from the weld interface 38, 42. In welding the housing 14, 18 of the media tank 10, at least some of the welding flash 74, as a byproduct of the welding process, is forced inward at the interface 38, 42 into the radial space between the inner walls 30, 34 of the housing 14, 18 and the divider 12. The outer ring support 48 has a sufficient axial length and thickness to force the flash 74 to buckle and fold against the outer profile of the outer ring support 48. This arrangement not only manages the flash 74 generated by the welding process, but also forms an outer, radial seal around the divider 12 to prevent at least some media from circumventing the screen 64. The O-ring 70 positioned within the channel 66 acts as a further radial seal and may additionally dampen the vibration against the tank walls 34, 38 and trap and keep flash 74 from leaking below the divider 12.

During the friction welding process, the clearance between the housing portion 14 and the divider 12 allows for sufficient movement of the housing portion 14 (relative to both the housing portion 18 and the divider 12) to create the heat necessary for welding together housing portions and creating the flash 74. In some embodiments, the flash 74 may fill gaps within the recess 46 such that the constrained motion of the divider 12 within the recess 46 is further constrained by the flash 74 as a result of the friction welding process. The flash 74 may extend axially around the protrusion 50, as shown in FIG. 1, thereby limiting axial movement of the divider 12 relative to the housing 14, 18. Further, the flash may extend between the different protrusions 50 (that are spaced about the circumference of the divider 12), thereby further constraining the relative rotation between the divider 12 and the housing 14, 18. The annular gap can advantageously be sized to accommodate the flash 74 such that the flash 74 does not extend radially inward beyond the outer ring 48, so that the flow of water through the screen 64 is not obstructed by flash.

In some embodiments, the outer walls of the housing 14, 18 may form a pocket 78 adjacent the interface 38, 42. The pocket 78 is located outside of the interior volume of the media tank 10, located radially outward from the interface 38, 42. In some embodiments, the pocket 78 may retain any flash that flows radially outward during the friction welding process 74 such that an outer profile of the media tank 10 lacks any visible flash. With no visible external flash, postprocessing steps for cleaning up the flash are eliminated.

In operation, assembling the media tank 10 includes forming a first housing portion 14, a second housing portion 18, and a divider 12. The components of the media tank 10 may be formed by, for example, injection molding. The divider 12 may be further assembled by incorporating the cloth insert 64 and the radial seal 70 into the support structure 48, 54, 58, 62. The divider 12 is positioned within the housing 14, 18, with the radial protrusions 50 located within the radial recess 46. The two housing portions 14, 18 are positioned adjacent one another such that the respective interfacing ends 38, 42 abut against one another. In this arrangement, the divider 12 is supported within the housing portion 18 and is axially aligned with the interface 38, 42, and is floating with respect to the housing portion 18. The two housing portions 14, 18 are fused together via a friction welding process, with relative rotational and/or oscillating motion between the housing portions 14, 18 generating heat and flash 74. The flash 74 is displaced in the welding process away from the interface 38, 42 and into the radial space between the housing 14, 18 and the divider 12. With the welding process completed and the housing portions 14, 18 fused together, the flash 74 cools, forming a radial seal between the housing 14, 18 and the divider 12.

The media tank 10 is therefore separated into the first chamber 20A defined primarily by the first housing portion 14 and the divider 12 and the second chamber 20B defined primarily by the second housing portion 18 and the divider 12. The flash 74 generated by the welding process provides a radial seal that precludes at least some media from passing around the divider 12 and bypassing the screen 64. As such, the divider 12 is capable of separating the media from the water with increased efficiency.

Various features of the disclosure are set forth in the following claims.

What is claimed is:

1. A media tank comprising:
   a housing having a first housing portion coupled to a second housing portion at an interface between the first and second housing portions, the first and second housing portions collectively defining an interior volume of the housing; and
   a divider positioned within the interior volume of the housing at the interface between the first and second housing portions to separate the interior volume into a first chamber at least partially defined by the first housing portion and the divider and a second chamber at least partially defined by the second housing portion and the divider,
   wherein the first housing portion is coupled to the second housing portion via a friction weld at the interface,
   wherein an annular gap is provided between the divider and the first housing portion,
   wherein flash from the friction weld is received within the annular gap, and
   wherein the divider comprises a plurality of radial protrusions positioned within a recess in the housing to maintain an axial alignment of the divider with the interface.

2. The media tank of claim 1, wherein the divider is configured to float relative to one of the first and second housing portions prior to the creation of the friction weld.

3. The media tank claim 1, further comprising a radial seal formed as an O-ring and coupled to the divider, the radial seal being located between the divider and the housing.

4. The media tank of claim 1, wherein the interface includes a planar, annular surface of the first housing portion abutted against a planar, annular surface of the second housing portion.

5. The media tank claim 1, wherein the divider is a water-permeable divider configured to allow water to flow therethrough.

6. The media tank of claim 5, wherein the divider includes a support structure and a cloth insert coupled to the support structure, wherein the support structure includes a plurality of ring supports extending from a central axis to an outer ring support, and wherein the cloth insert is water permeable.

7. The media tank of claim 6, further comprising a cylindrical passage defined by the divider and connecting the first chamber to the second chamber, bypassing the cloth insert.

8. The media tank of claim 6, wherein the flash is a radial seal between the outer ring support and the housing.

9. The media tank of claim 6, wherein the flash is entirely located radially outward of the outer ring support.

10. A method of assembling a media tank, the method comprising:
    providing a divider at an interface between a first housing portion and a second housing portion, the divider separating an interior volume defined by the first and second housing portions into a first chamber and a second chamber, at least one of the first and second housing portions being free to translate with respect to the divider;
    friction welding the first housing portion to the second housing portion, thereby generating flash at the interface;
    preventing translation between said at least one of the first and second housing portions and the divider with the flash generated at the interface; and
    locating a radial protrusion of the divider within a recess defined by the second housing portion to maintain an axial alignment of the divider with the interface prior to friction welding the first housing portion to the second housing portion.

11. The method of claim 10, further comprising forming a radial seal, wherein forming the radial seal includes providing an O-ring between the divider and the housing.

12. The method of claim 10, wherein providing the divider at the interface includes providing the divider radially within the first and second housing portions at an axial position that is aligned with the interface.

13. The method of claim 10, further comprising directing the flash into an annular gap between the first housing portion and the divider.

14. A media tank comprising:
    a housing having a first housing portion coupled to a second housing portion at an interface between the first and second housing portions, the housing having a radial recess formed at or adjacent to the interface, the first and second housing portions collectively defining an interior volume of the housing; and
    a divider positioned within the interior volume of the housing at the interface between the first and second housing portions, the divider having a radial protrusion that extends into the radial recess of the housing to maintain the axial position of the divider at the interface;
    wherein the first housing portion is coupled to the second housing portion via a friction welding process that generates flash at the interface, and
    wherein the flash forms at least a partial radial seal between the divider and the housing.

15. The media tank of claim 14, wherein the interface includes a planar, annular surface of the first housing portion abutted against a planar, annular surface of the second housing portion.

16. The media tank of claim 14, wherein the divider is a water-permeable divider configured to allow water to flow therethrough.

17. The media tank of claim 16, wherein the divider includes a support structure and a cloth insert coupled to the support structure, wherein the support structure includes a plurality of ring supports extending from a central axis to an outer ring support, and wherein the cloth insert is water permeable.

18. The media tank of claim 14, wherein the flash is a first radial seal, the media tank further comprising a second radial seal separate from the flash, formed as an O-ring and coupled to the divider, the second radial seal being located between the divider and the housing.

* * * * *